United States Patent
Pitzer et al.

(10) Patent No.: US 8,991,731 B2
(45) Date of Patent: *Mar. 31, 2015

(54) LOW SHEAR SWIVEL FITTING

(71) Applicant: Hosco Fittings, LLC, Wixom, MI (US)

(72) Inventors: Jan Pitzer, Brighton, MI (US); Bill Bertakis, Keego Harbor, MI (US); Jerry Verhoven, Macomb, MI (US); Randall Sandifur, Allen Park, MI (US)

(73) Assignee: Hosco Fittings, LLC, Wixom, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/975,140

(22) Filed: Aug. 23, 2013

(65) Prior Publication Data

US 2013/0341436 A1    Dec. 26, 2013

Related U.S. Application Data

(62) Division of application No. 12/356,255, filed on Jan. 20, 2009, now Pat. No. 8,517,288.

(51) Int. Cl.
*B05B 15/08* (2006.01)
*F16L 19/025* (2006.01)
*F16L 19/02* (2006.01)

(52) U.S. Cl.
CPC .......... *F16L 19/025* (2013.01); *F16L 19/0225* (2013.01)
USPC ........ 239/587.1; 239/124; 239/303; 239/332; 239/525; 239/575; 239/588; 239/600; 285/98; 285/272; 285/275; 285/282

(58) Field of Classification Search
CPC .......... B05B 9/01; B05B 7/32; B05B 7/2472; B05B 7/0408; B05B 11/0005; B05B 9/0861; B05B 7/2416; B05B 1/3033; B05B 15/008; B05B 15/066; B05B 15/067; B05B 15/065; A61K 2800/88; A61K 2800/28; A61K 2800/63; F16L 27/0828; F16L 27/0832; F16L 27/08; F16L 27/0812; F16L 27/0816; F16L 27/082; F16B 7/1427; F16C 11/06
USPC ........ 239/124, 303, 304, 329, 332, 525, 575, 239/587.1, 588, 600; 285/98, 272, 275, 282
See application file for complete search history.

(56) References Cited

U.S. PATENT DOCUMENTS

| | | | |
|---|---|---|---|
| 2,118,670 A | 5/1938 | Green | |
| 3,160,426 A | 12/1964 | Faeser | |
| 3,258,279 A | 6/1966 | Johnsen | |
| 4,572,551 A | 2/1986 | Jaquette | |
| 5,060,861 A * | 10/1991 | Holt | ............................ 239/124 |
| 5,083,819 A | 1/1992 | Bynum | |
| 5,110,160 A | 5/1992 | Brozovic | |

(Continued)

OTHER PUBLICATIONS

International Search Report and Written Opinion for PCT/US10/20419.

*Primary Examiner* — Steven J Ganey
(74) *Attorney, Agent, or Firm* — Gifford, Krass, Sprinkle, Anderson & Citkowski, P.C.

(57) ABSTRACT

A swivel fitting used to connect to various components in a fluid handling system is provided. The swivel fitting incorporates an annular chamfer surface to reduce the affect that the fitting has on the flow properties of the fluid when the fluid is caused to flow through the fitting. The use of the swivel fitting in a paint supply line is also described.

6 Claims, 6 Drawing Sheets

(56) References Cited

U.S. PATENT DOCUMENTS

| | | |
|---|---|---|
| 5,501,397 A | 3/1996 | Holt |
| 5,718,458 A | 2/1998 | Erstad |
| 5,823,438 A | 10/1998 | Holt |
| 6,179,223 B1 * | 1/2001 | Sherman et al. ............ 239/124 |
| 6,572,029 B1 | 6/2003 | Holt |
| 7,083,120 B2 | 8/2006 | Gilpatrick et al. |
| 2006/0237964 A1 | 10/2006 | Nielson |
| 2008/0012307 A1 * | 1/2008 | Taillon ............ 285/282 |
| 2008/0224468 A1 | 9/2008 | Dohm et al. |

\* cited by examiner

LOW SHEAR SWIVEL FITTING

CROSS-REFERENCE TO RELATED APPLICATIONS

This application is a division of U.S. patent application Ser. No. 12/356,255 filed on Jan. 20, 2009, the contents of which are incorporated herein in their entirety.

FIELD OF THE INVENTION

This disclosure relates generally to fluid couplings or fittings for use in pressurized lines or tubing that circulates or delivers a fluid, such as a liquid or gas, from a reservoir to an applicator. More specifically, the present disclosure relates to a swivel fitting used in a system that circulates and applies a paint, coating, adhesive, or sealant.

BACKGROUND OF THE INVENTION

Conventional paint or adhesive supply systems comprise some form of a reservoir, such as a mixing tank having a means for agitating or mixing the material (e.g., paint or adhesive); a pump for transferring the mixed material under a desired pressure through a pipe line or hose; an applicator, such as a manual or automated spray gun for delivering a paint or a flow applicator for applying an adhesive to a manufactured product; and optionally, a return pipeline or hose for the recirculation of any unused material back to the reservoir along with various in-line metering devices, flow regulators, and valves. A paint or adhesive supply system utilizes a variety of different couplings or fittings in order to effectively connect the various system components to the pipeline or hose through which the material is transferred.

Continuing problems associated with the circulation and application of materials, such as paints and adhesives, include the degradation of either the polymers or pigments in the material, the settling or separation of the solid pigments from the liquid medium in the material, the introduction of foreign particulates or the creation of agglomerates during the transfer of the material, and the creation of leaks or spills from the supply system components that are not effectively coupled to the pipeline or hose. In each of these cases, the possibility of imperfections in the paint finish, paint pattern, or adhesive bead applied to a manufactured product exists, which ultimately creates the necessity of rework or results in process inefficiency through the creation of scrap parts. A further process inefficiency results from system downtime when production must be halted in order to repair a leaking connection in the supply system.

In order for a coupling or fitting to effectively connect supply system components to a pipeline or hose, it is necessary for the fitting to make a robust static connection between the system component and the pipeline. Unfortunately, often the creation of such a connection enhances the probability of degrading the material or accelerating pigment agglomeration by altering the flow or rheological properties exhibited by the material in the vicinity of the seal. In addition, such a connection may also require the application of a substantial amount of torque to the assembled threaded components, which is difficult to consistently apply under the variety of different conditions encountered in a manufacturing environment. Accordingly, there exists a need in the industry to continually improve the ability of a coupling or fitting to engage and effectively seal between the pipeline and various system components upon the application of a lower amount of torque and without affecting the rheological or flow properties of the paint or adhesive.

SUMMARY OF THE INVENTION

Devices and systems consistent with the present invention generally provide a swivel fitting for use in coupling to first and second components in a system that transfers a fluid, such as a liquid or gas, under pressure. One embodiment of a swivel fitting constructed in accordance with the teachings of the present invention, generally comprises a body having a fluid passage extending from a first end to a second end and an internally threaded fastening sleeve received over the first end capable of receiving and mating with an externally threaded end of the first component. The first end has an end face, an external surface, and an internal surface; the end face being an annular flat surface, the external surface being a convex annular surface, and the internal surface being an annular chamfer surface that defines a portion of the fluid passage; and a connector for coupling the second end to the second component. The convex, external surface of the first end engages the concave, annular surface of the first component, thereby, establishing a region of contact. It is this region of contact that forms a static seal between the swivel fitting and the first component. The internal surface reduces the affect that the end face has on the flow properties of the fluid when the fluid flows from the first component through the fluid passage of the swivel fitting to the second component.

According to one aspect of the present disclosure, the chamfer surface makes an angle ($\alpha$) of less than 90 degrees between the flow passage and the end face with less than about 60 degrees being preferred and less than about 30 degrees being especially preferred.

According to another aspect of the present disclosure, the connector for coupling the second end of the swivel fitting to the second component may be via a compression-type connection, a ball and cone-type connection, an NPT-type connection, or a clamp-type connection. Preferably, the connector for coupling the second end of the swivel fitting to the second component in the fluid handling system is a compression-type connection to a hose or a connection that is substantially similar to the means in which the fitting connects the first end to a first component.

Another object of the present disclosure is to provide a paint supply system for supplying paint from a reservoir to the surface of a manufactured part. The paint supply system comprises a pump for pressurizing the paint in order to cause the paint to flow; a pipeline or hose through which the paint flows; an applicator for applying the paint to the surface of the manufactured part; at least one secondary component selected from the group of filters, restrictors, connectors, tees, manifolds, valves, meters, and regulators; and at least one swivel fitting used to couple the secondary component to the pipeline. The swivel fitting used in this system is a fitting made using the teachings described in this disclosure. Optionally, the swivel fitting may be used on the air line supplying air to the applicator to aid in the atomization (e.g., formation of droplets) of the paint.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE PREFERRED EMBODIMENTS

The following description is merely exemplary in nature and is in no way intended to limit the present disclosure or its application or uses. It should be understood that throughout the description and drawings, corresponding reference numerals indicate like or corresponding parts and features.

The present disclosure generally provides a swivel fitting used to couple various components in a system that transfers a fluid under pressure. More specifically, the swivel fitting is used to couple with a first component and a second component in the fluid handling system where at least the first component has a concave annular surface through which a coupling can be made. The swivel fitting generally comprises a body having a fluid passage extending from a first end to a second end and an internally threaded fastening sleeve received over the first end capable of receiving and mating with an externally threaded end of the first component. The first end has an end face, an external surface, and an internal surface with the end face being an annular flat surface, the external surface being a convex annular surface, and the internal surface being an annular chamfer surface that defines a portion of the fluid passage; and a connector for coupling the second end to the second component. In this fitting, the convex, external surface of the first end engages the concave, annular surface of the first component, thereby, establishing a region of contact. It is this region of contact, i.e., region of metal-to-metal contact that forms a static seal between the swivel fitting and the first component.

The benefit of the annular chamfer surface, e.g., the internal surface, is that it reduces the affect that the end face has on the flow properties of the fluid when the fluid flows from the first component through the fluid passage of the swivel fitting to the second component.

Figure 1A:
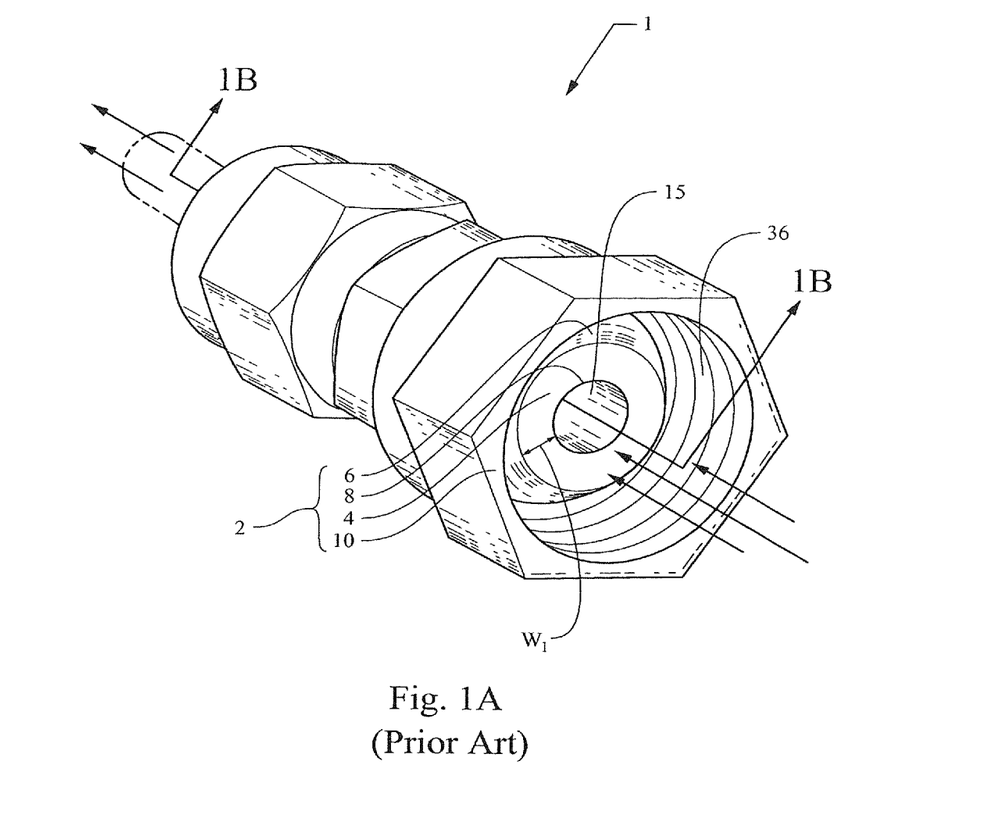
FIG. 1A is a perspective view of a conventional swivel fitting.
Figure 1B:
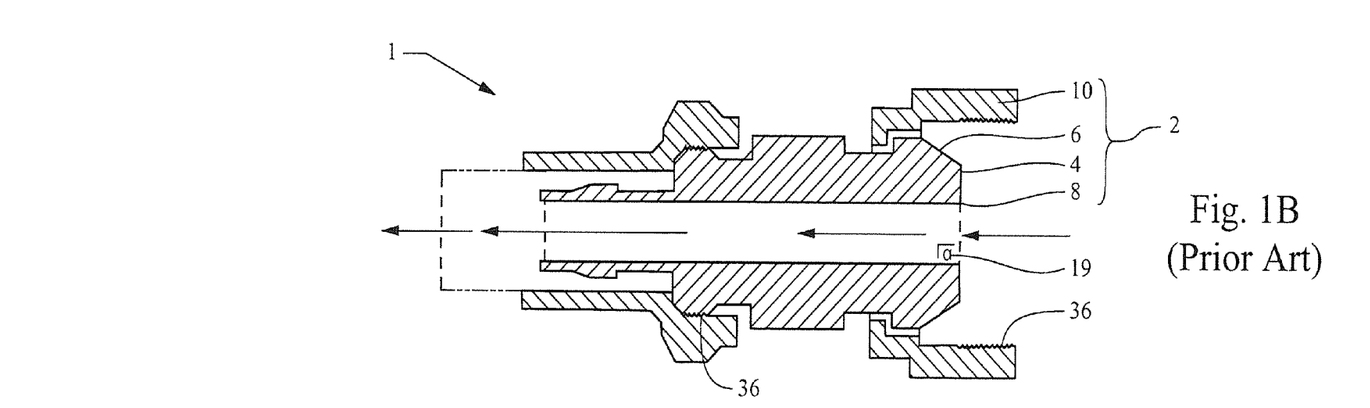
FIG. 1B is a cross-sectional view of the conventional swivel fitting of FIG. 1A shown along plane 1B.
Figure 1C:
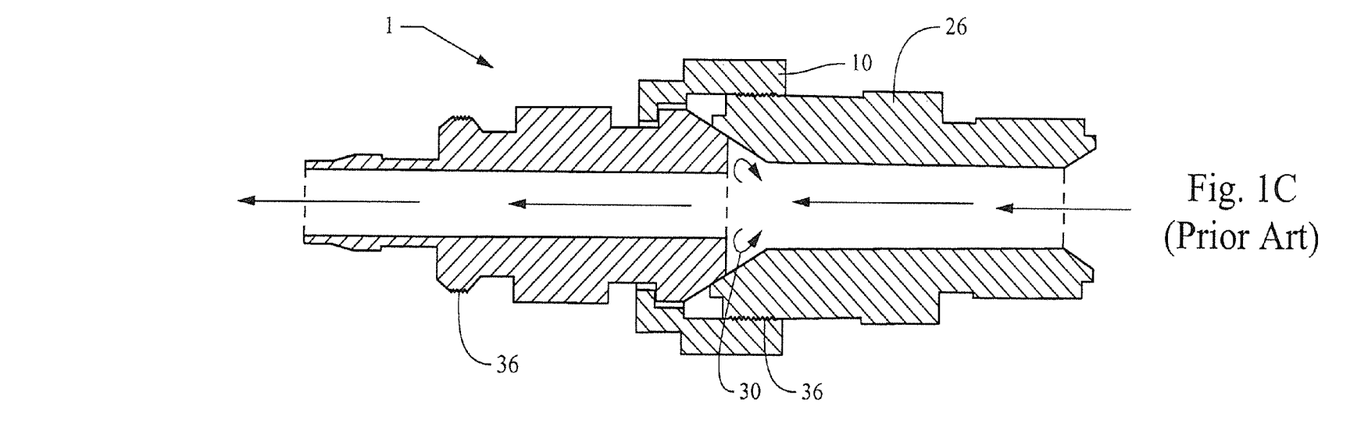
FIG. 1C is a cross-sectional view of a conventional swivel fitting coupled to another component in a fluid handling system.

Referring to FIGS. 1A-1C, a conventional swivel fitting 1 known to one skilled in the art generally comprises an end 2 with a substantially flat annular face 4 having a width ($w_1$), a convex outer surface 6, and a hexagonal nut 10 for coupling to another component 26 in a fluid transfer system. Typically, $w_1$ is greater than about 1 mm. The threads 36 of the nut 10 are capable of receiving and mating with the concave surface of the externally threaded end of this other component 26. Tightening of the nut 10 forces the threaded end of the component 26 to engage the convex outer surface 6 forming a metal-to-metal seal between the surface 6 and the end of the component. The convex outer surface 6 also allows one to adjust (e.g., swivel) the position of the threaded end of the other component 26 to insure a substantial area is engaged prior to tightening the nut 10. The interior edge 8 of the flat annular face 4 makes an angle ($\alpha$) 19 of about 90 degrees with the wall 15 of the fluid passage that transgresses the length of the fitting 1. Typically the interior edge 8 of the face 4 and the orifice in the end of the attached component 26 are not in perfect alignment or similarly sized, thereby, establishing a ledge, blunt surface, or obstacle in the flow path of the fluid. According to one aspect of the present disclosure this obstruction in the flow path may create turbulent flow, the formation of eddy currents 30, and the creation of particle agglomeration, separation of pigments from the carrier medium in the paint or adhesive, and the occurrence of degradation to the properties exhibited by the paint or adhesive, as well as the possibility of leakage from the connection between the swivel fitting 1 and the other component 26 in the fluid handling system if not enough torque has been applied to the nut 10.

Figure 2A:
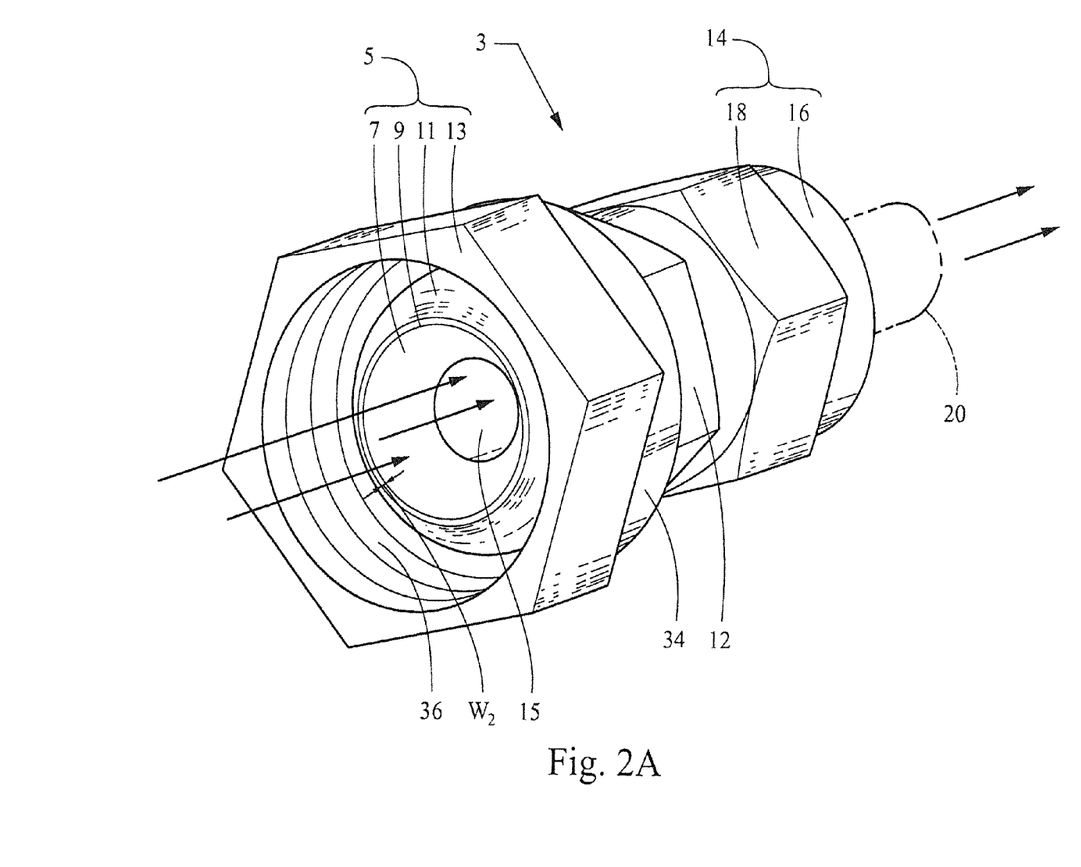
FIG. 2A is a perspective view of a swivel fitting having a first end and a second end according to one form of the present disclosure with various aspects of its first end highlighted.
Figure 2B:
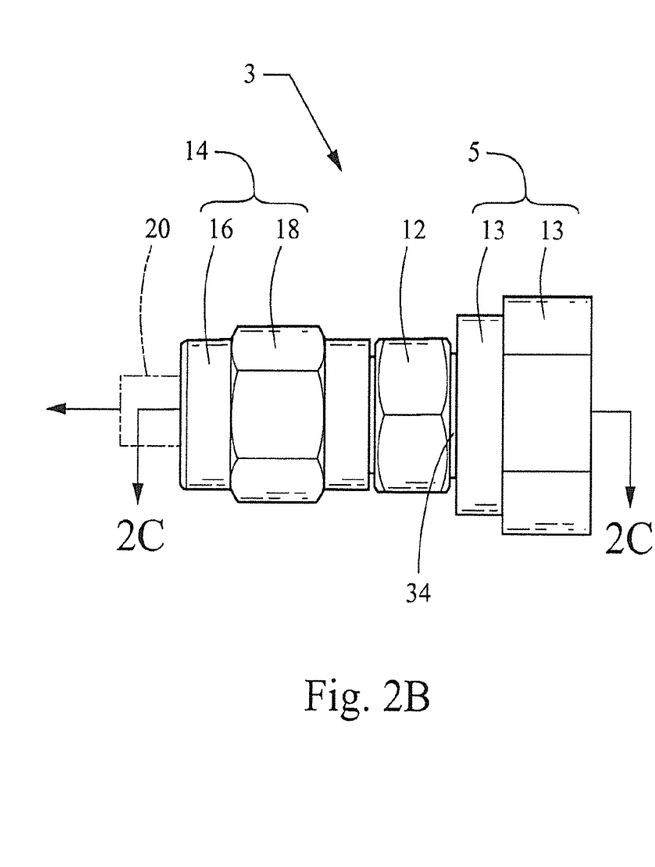
FIG. 2B is a side-view of a swivel fitting having a first end and a second end according to one form of the present disclosure.

Referring now to FIGS. 2A and 2B, the swivel fitting 3 according to one embodiment of the present disclosure has a body 34 with a fluid passage 15 extending from a first end 5 to a second end 14. An internally threaded 36 fastening sleeve 13 received over the first end 5 of the fitting 3 is capable of receiving and mating with an externally threaded end of a first component in the fluid handling system. The fastening sleeve 13 may be hexagonal in geometry in order to more easily apply torque using a wrench when tightening the nut over the threaded end of the first component.

The first end 5 of the swivel fitting 3 has an end face 9, an external surface 11, and an internal surface 7. The end face 9 being an annular flat surface, the external surface 11 being a convex annular surface, and the internal surface 7 being an annular chamfer surface that defines a portion of the fluid passage 15. The fitting 3 further comprises a connector for coupling the second end 14 of the fitting 3 to a second component in the fluid handling system. The first end 5 forms a static, metal-to-metal seal between the end of the first component and the external surface 11. The body 34 of the swivel fitting 3 having fluid passage 15 may be any desired length preferably ranging from about 2-3 centimeters to about 10 centimeters.

Figure 2C:
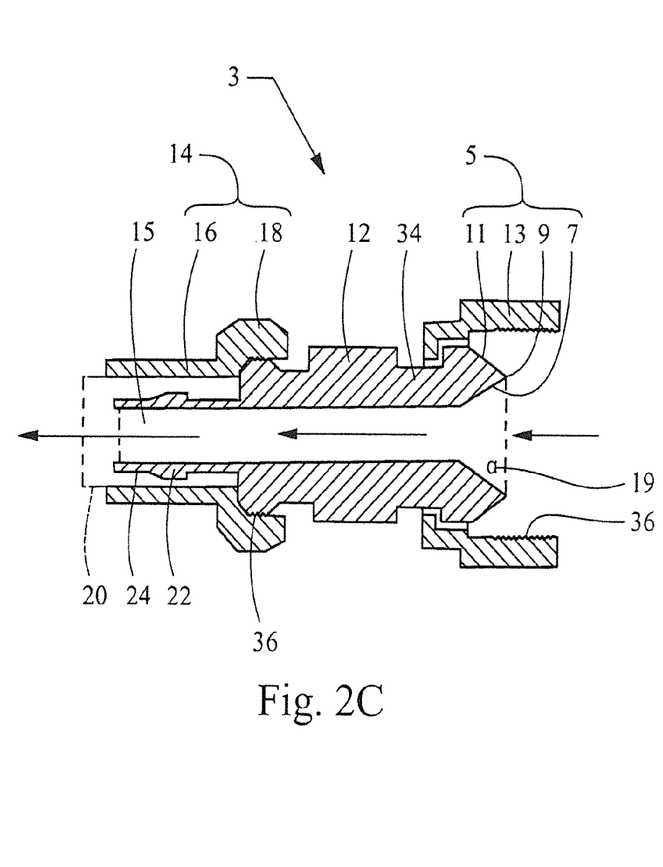
FIG. 2C is a cross-sectional view of the swivel fitting of FIG. 2B shown along plane 2C.
Figure 2D:
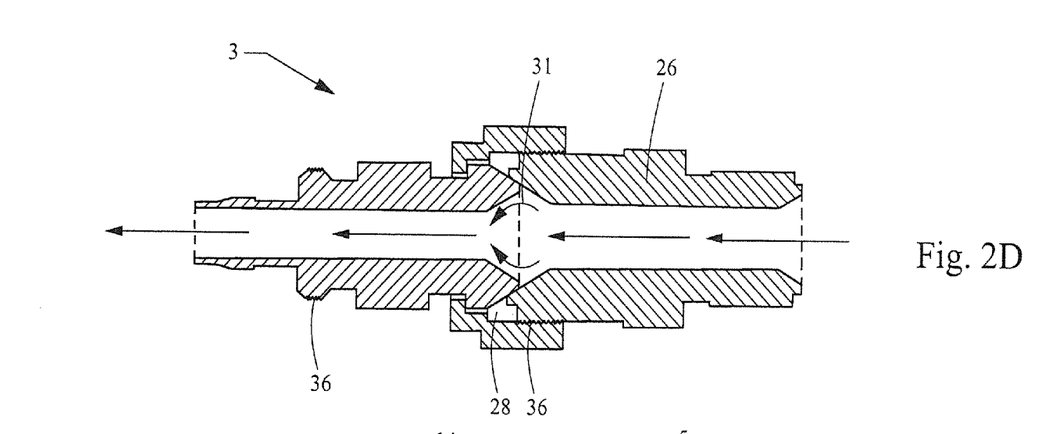
FIG. 2D is a cross-sectional view of a swivel fitting according to one form of the present disclosure coupled to another component in a fluid handling system.

Referring now to FIGS. 2C and 2D, according to one aspect of the present disclosure, an example of a benefit associated with the swivel fitting 3 is a reduction in the affect that the end face 9 has on the flow properties of the fluid. Although the fluid may flow through the fluid passage 15 from the first end 5 to the second end 14 or from the second end 14 to the first end 5 of the swivel fitting 3, the greatest benefit is achieved when the fluid flows from the first end 5 through the fluid passage 15 to the second end 14. Reducing the disturbance of the flow properties exhibited by the fluid is achieved by the creation of the annular chamfer or internal surface 7 on the first end 5. This annular chamfer results in the end face 9 having a width ($w_2$) which is substantially smaller than the width ($w_1$) of the flat annular face 4 associated with a conventional swivel fitting 1 (see FIG. 1A). Preferably, $w_2$ is less than about 1 mm. The presence of the internal surface 7 decreases the occurrence of a mismatch in the flow passage 15 and the orifice in the first component 26 when the threaded end of the first component 26 is swiveled along the convex curvature of the exterior surface 11 in order to effectively engage it. Minimizing the formation of any ledge, blunt surface, or obstacle in the flow path 31 assists in reducing turbulence and the formation of eddy currents, the creation of particle agglomeration, the separation of pigments from the carrier medium in the paint, or similar fluid, and the degradation of material properties.

According to another aspect of the present disclosure, another example of a benefit associated with the swivel fitting 3, is the ability to form an effective metal-to-metal seal between the exterior surface 11 and the threaded end of the first component 26 by applying a lower amount of torque to the fastening sleeve 13. A lower amount of torque being necessary to form an effective seal reduces the possibility of leakage from the connection between the swivel fitting 3 and the first component 26 in the fluid handling system.

The external surface 11 of the first end 5 of the swivel fitting 3 is convex having a radius of curvature that is substantially constant relative to a point centrally located to the flow passage 15. The purpose of this curvature is to allow an operator to align (e.g., swivel) the threaded end of the first component 26 to more effectively engage it in order to provide a better seal when the fastening sleeve 13 is tightened. The fastening sleeve 13 is loosely fit around the body 34 of the swivel fitting 3 to allow for the desired swivel. Thus when assembled an air gap 28 may exist between the internal surface of the fastening sleeve 13 and the body 34 of the swivel fitting 3. The geometry of the fastening sleeve 13 preferably is hexagonal in order to utilize a wrench to apply the necessary torque to tighten the fastening sleeve 13 over the threaded end of the first component 26. The body 34 of the swivel fitting 3 may comprise an area 12 that is also hexagonal in geometry in order to utilize another wrench to maintain the positioning of the swivel fitting 3 while torque is being applied to the fastening sleeve 13.

The first component 26 may be any component known to one skilled in the art that can be attached in-line to a system that transfers fluids. The first component 26 may include, but not be limited to a pipe, a hose, a valve, a filter, a restrictor, a T-connector, and a flow regulator. According to one aspect of the present disclosure, when the fluid transfer system is a paint line or the portion of the paint line associated with a spray gun or applicator, the first component is preferably, a hose, small filter, or flow restrictor.

The fluids transferred through the fluid passage 15 and the rest of the fluid handling system may be any desired liquid or gas. Preferably, the liquid is some type of a paint, coating, adhesive, or sealant, while the gas is preferably air, nitrogen, or carbon dioxide.

The second end 14 of the swivel fitting 3 may comprise any means of connecting the second end 14 to a second component in the fluid handling system. The connector for coupling the second end 14 to a second component may include, but not be limited to, a compression-type connection, a ball and cone-type connection, an NPT-type connection, and a clamp-type connection. A ball and cone-type connection is similar to a pipe union connection. A compression-type connection may include the use of a ferrule and a nut to form a mechanical seal.

According to one aspect of the present disclosure as shown in FIGS. 2A-2D, the type of connection made between the second end 14 of the swivel fitting 3 and a second component is a compression-type connection. The second end 14 of the swivel fitting 3 preferably comprises a compression hose connection that has an elongated cylinder 24 that forms a part of the fluid passage 15. The elongated cylinder 24 includes a raised annular surface or barb 22 that may engage the internal surface of hose 20. An internally threaded 36 fastening sleeve 16 having a hexagonal outer surface 18 may be received over the second end 14 of the swivel fitting 3 and over the external surface of the hose 20. This fastening sleeve 16 is capable of receiving and mating to the swivel fitting 3 and upon tightening causes the hose 20 to compress and more effectively engage the barb 22, thereby, creating a tight seal.

Figure 2E:
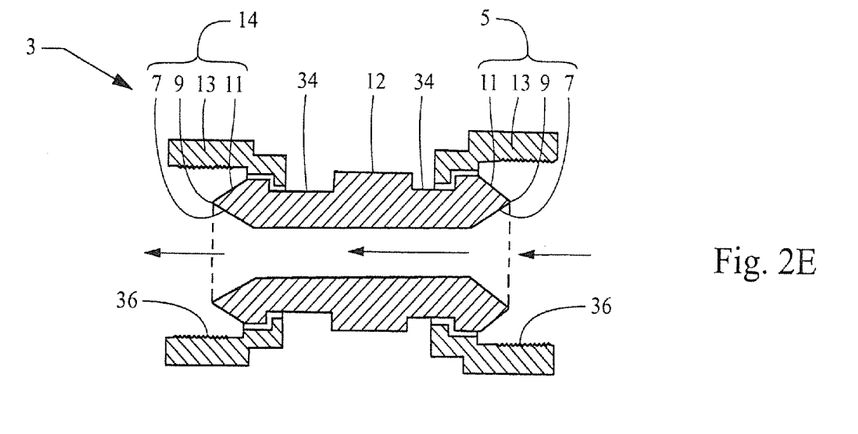
FIG. 2E is a cross-sectional view of a swivel fitting according to another form of the present disclosure.

According to another aspect of the present disclosure, the type of connection made between the second end 14 of the swivel fitting 3 and a second component may be substantially similar to the means in which the first end 5 of the swivel fitting 3 is connected to the first component 26. Referring now to FIG. 2E, the second end 14 of the swivel fitting 3 may preferably comprise an internally threaded fastening sleeve 13 received over the second end 14 capable of receiving and mating with an externally threaded end of a second component. The second end 14 has an end face 9, an external surface 11, and an internal surface 7 with the end face 9 being an annular flat surface, the external surface 11 being a convex annular surface, and the internal surface 7 being an annular chamfer surface that defines a portion of the fluid passage 15. The external surface 11 forms a static seal with end of the second component. The internal surface 7 reduces the affect that the end face 9 has on the flow properties of the fluid when the fluid flows from the second component through the fluid passage 15 of the swivel fitting 3 to the first component 26. Normally this benefit would not be observed because the flow of fluid generally goes in the opposite direction. One benefit of having the first end 5 and second end 14 of the swivel fitting 3 being the same is to allow the user to incorporate the fitting 3 into the fluid handling system in either orientation.

The second component may be any component known to one skilled in the art that can be attached in-line to a system that transfers fluids. The second component may include, but not be limited to a pipe, a hose, a valve, a filter, a restrictor, a QD connection, a T-connector, and a flow regulator. According to one aspect of the present disclosure, when the fluid transfer system is a paint line or the portion of the paint line associated with a spray gun or applicator, the second component is preferably a hose, a QD connection, or an applicator.

Referring now to FIG. 2C, the interior surface 7 (i.e., chamfer surface) of the first end 5 of the swivel fitting 3, which starts at the flow passage 15, and intersects the end surface 9 at an angle (a) 19 that is less than 90 degrees. An angle of 90 degrees would eliminate the existence of the interior surface 7 because the end surface 9 would then intersect with the wall of the flow passage 15. Preferably, the angle (a) 19 is less than about 60 degrees, with an angle ($\alpha$) 19 of less than about 30 degrees being especially preferred.

The diameter of flow passage 15 in the swivel fitting 3 may range from about 3/32 inch to about 1/2 inch. Preferably the diameter of the flow passage 15 is about 3/8 inch. The swivel fitting 3 may be made out of any material known to one skilled in the art, including but not limited to, stainless steel, Inconel alloy, ferrous metal, brass, aluminum, and bronze, Preferably, the swivel fitting 3 is made out of stainless steel, such as 303, 304L, or 316 stainless.

Figure 3:
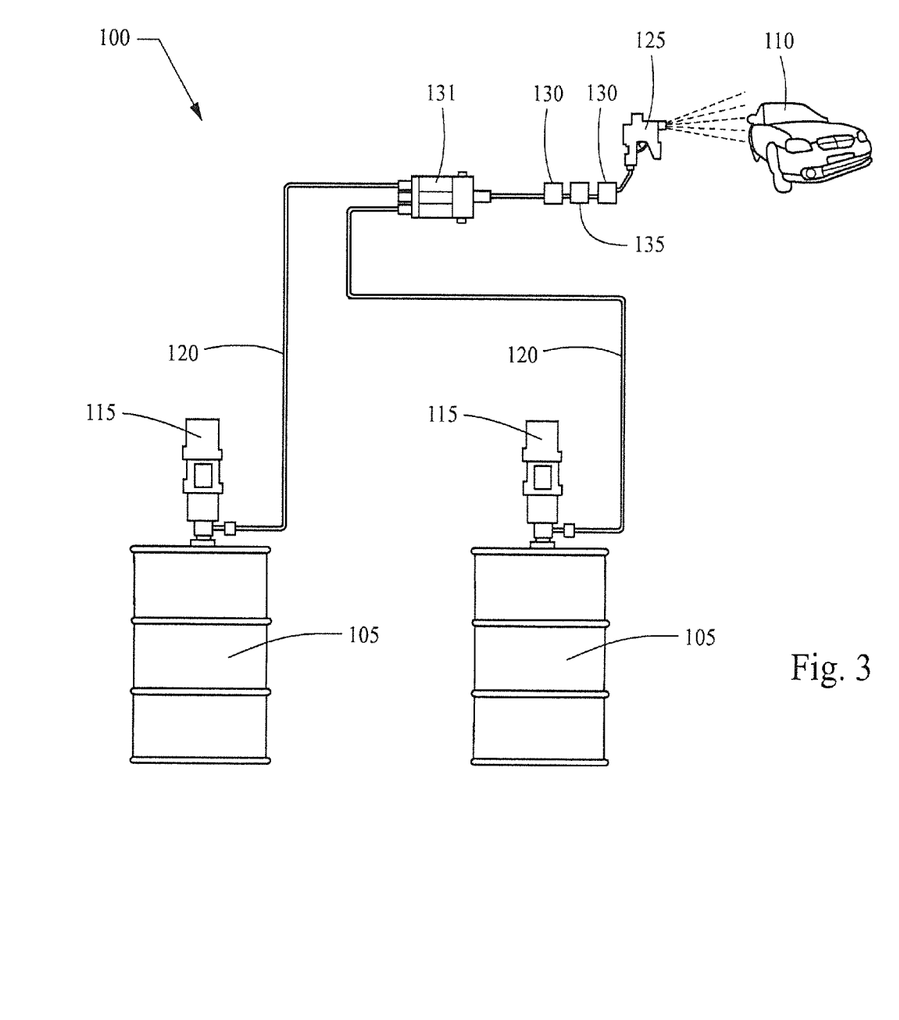
FIG. 3 is a schematic representation of a paint supply system incorporating a swivel fitting according to one form of the present disclosure.

Referring now to FIG. 3, it is another objective of the present disclosure to provide a paint supply system 100 for supplying paint from a reservoir 105 to the surface of a manufactured part 110. The paint supply system 100 comprises a pump 115 for pressurizing the paint in order to cause the paint to flow; a pipeline 120 or hose through which the paint flows; an applicator 125 for applying the paint to the surface of the manufactured part 110; at least one secondary component 130 selected from the group of filters, restrictors, connectors, tees, manifolds, valves, meters, and regulators; and at least one swivel fitting 135 used to couple the secondary component 130 to the hose 120 or applicator 125. The pipe or hose 120 may be a rigid material, such as steel, or a flexible conduit designed to enhance the mobility or movement of the applicator 125. The paint supply system 100 may comprise multiple lines transferring paint of a different color to a set of color change valves 131 prior to being transferred to the applicator 125.

The swivel fitting 135 used in the paint supply system 100 is substantially similar to the swivel fitting 3 described in FIGS. 2A-2E, which comprises a body having a fluid passage 15 extending from a first end 5 to a second end 14. Preferably, the swivel fitting 3 has a first end 5 that comprises an internally threaded fastening sleeve 13 received over the end 5 capable of receiving and mating with an externally threaded end of a secondary component or the pipeline. The first end 5 has an end face 9, an external surface 11, and an internal surface 7; the end face 9 being an annular flat surface, the external surface 11 being a convex annular surface, and the internal surface 7 being an annular chamfer surface that defines a portion of the fluid passage 15. The first end 5 forms a static metal-to-metal seal between the end of the secondary component or pipeline and the external surface 11. The internal surface 7 reduces the affect that the end face 9 has on the flow properties of the paint when the paint flows from the first end 5 through the fluid passage to the second end 14. Optionally, the swivel fitting 3 may be used on the air line supplying air to the applicator to aid in the atomization (e.g., formation of droplets) of the paint.

The second end 14 of the swivel fitting 3 used in the paint supply system 100 may comprise a compression-type hose connection or a means of connecting to the second component that is substantially similar to the means previously described for connecting the first component to the first end 5. When the second end 14 comprises a compression-type hose connection, such a connection may be substantially similar to the hose connection previously described in FIGS. 2A-2D. When the second end 14 comprises a connection that is substantially similar to connection used on the first end 5 of the swivel fitting 1 as shown in FIG. 2E, the internal surface 7 may reduce the affect that the end face 9 has on the flow properties of the paint when the paint flows from the second end 14 through the fluid passage 15 to the first end 5. One skilled in the art will understand that other components may be incorporated into the fluid handling system without departing from the scope of the present disclosure.

The following specific example is given to illustrate a teaching of the present disclosure and should not be construed to limit the scope of the invention.

EXAMPLE 1

Torque Level Comparison

A conventional swivel fitting 1 and a swivel fitting 3 made according to the teachings of the present disclosure were placed into substantially similar paint supply systems 100. The application of a tightening force of 650 in-lbs was required to sufficiently tighten the nut 10 of the conventional fitting 1 to form a metal-to-metal seal with a secondary component that eliminated any leakage of paint. In comparison the application of a tightening force of 325 in-lbs was required to sufficiently tighten the fastening sleeve 13 of the swivel fitting 3 of the present disclosure to form a metal-to-metal seal with a secondary component that eliminated any leakage of paint. This example demonstrates that less torque or tightening force is necessary to be applied to the swivel fitting 3 made according to the teachings of the present disclosure in order to effectively seal against leaks. In this specific example, the amount of torque necessary to Rhin an effective seal using the swivel fitting 3 of the present disclosure is about 50% less than the torque necessary to for an effective seal using a conventional swivel fitting 1.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A paint supply system for supplying paint from a reservoir to the surface of a manufactured part, the paint supply system comprising:
   a pump for pressurizing the paint in order to cause the paint to flow;
   a hose through which the paint flows;
   an applicator for applying the paint to the surface of the manufactured part;
   at least one secondary component selected from the group of filters, restrictors, connectors, tees, manifolds, valves, meters, and regulators having a concave annular surface through which a coupling can be made; and
   at least one swivel fitting used to couple the secondary component to the hose;
   the swivel fitting comprising a body having a fluid passage extending from a first end to a second end;
   an internally threaded fastening sleeve received over the first end capable of receiving and mating with an externally threaded end of the secondary component;
   the first end having an end face, an external surface, and an internal surface; the end face being an annular flat surface, the external surface being a convex annular surface, and the internal surface being an annular chamfer surface that defines a portion of the fluid passage; and
   a second end that makes a compression-type connection to the hose;
   wherein the convex external surface of the first end engages the concave annular surface of the secondary component, thereby, establishing a region of contact;
   the region of contact being axially spaced along said convex external surface of the first end and said concave annular surface of the secondary component to define a radially expanded portion of the fluid passage at the juncture of said secondary component and said first end;
   the axial spacing of said region of contact providing a portion of said concave annular surface of the secondary component and a portion of the convex external surface of said first end forming the radially expanded passage portion of the fluid passage wherein interference with flow through the passage is minimized; and
   wherein the region of contact forms a static seal between the swivel fitting and the secondary component.

2. The paint supply system of claim 1, wherein the compression-type connection comprises:

an elongated cylinder that forms a part of the fluid passage;

a raised annular surface or barb on the surface of the elongated cylinder to engage the internal surface of a hose; and an internally threaded fastening sleeve received over the second end and the external surface of the hose, which is capable of receiving and mating to the swivel fitting;

wherein upon tightening the fastening sleeve causes the hose to compress and more effectively engage the barb to create a tight seal.

3. The paint supply system of claim 1, wherein the annular chamfer surface of the swivel fitting makes an angle ($\alpha$) of less than 90 degrees between the flow passage and the end face.

4. The paint supply system of claim 3, wherein the angle ($\alpha$) is less than about 60 degrees.

5. The paint supply system of claim 4, wherein the angle ($\alpha$) is less than about 30 degrees.

6. The paint supply system of claim 1, wherein the diameter of the flow passage is in the range of about 3/32 inch to about 1/2 inch.

* * * * *